(12) United States Patent
Liu et al.

(10) Patent No.: US 7,988,855 B2
(45) Date of Patent: Aug. 2, 2011

(54) MEMBRANE BIOREACTOR HAVING SINGLE HEADER MEMBRANE MODULE

(75) Inventors: Minggang Liu, Burlington (CA); Hidayat Husain, Brampton (CA)

(73) Assignee: Zenon Technology Partnership, Wilmington, DE (US)

(*) Notice: Subject to any disclaimer, the term of this patent is extended or adjusted under 35 U.S.C. 154(b) by 0 days.

(21) Appl. No.: 11/780,891

(22) Filed: Jul. 20, 2007

(65) Prior Publication Data

US 2008/0000832 A1  Jan. 3, 2008

Related U.S. Application Data

(63) Continuation of application No. 10/968,883, filed on Oct. 21, 2004, now abandoned.

(60) Provisional application No. 60/614,980, filed on Oct. 4, 2004, provisional application No. 60/512,700, filed on Oct. 21, 2003.

(51) Int. Cl.
*B01D 63/00* (2006.01)

(52) U.S. Cl. .......... 210/321.8; 210/321.89; 210/321.69; 210/257.2

(58) Field of Classification Search .............. 210/650, 210/636, 257.2, 195.2, 321.8, 321.69, 321.89, 210/321, 88
See application file for complete search history.

(56) References Cited

U.S. PATENT DOCUMENTS

| | | | |
|---|---|---|---|
| 4,540,490 A | 9/1985 | Shibata et al. | |
| 4,547,289 A | 10/1985 | Okano et al. | |
| 4,886,601 A | 12/1989 | Iwatsuka et al. | |
| 5,472,607 A | 12/1995 | Mailvaganam et al. | |
| 5,480,553 A | 1/1996 | Yamamori et al. | |
| 5,482,625 A | 1/1996 | Shimizu et al. | |
| 5,607,593 A * | 3/1997 | Cote et al. | 210/650 |
| 5,639,373 A | 6/1997 | Mahendran et al. | |
| 5,695,222 A * | 12/1997 | Hodges | 285/3 |
| 5,922,201 A | 7/1999 | Yamamori et al. | |
| 5,944,997 A | 8/1999 | Pedersen et al. | |
| 6,126,819 A | 10/2000 | Heine et al. | |
| 6,156,200 A * | 12/2000 | Zha et al. | 210/321.89 |
| 6,280,626 B1 | 8/2001 | Miyashita et al. | |
| 6,325,928 B1 * | 12/2001 | Pedersen et al. | 210/232 |
| 6,592,759 B2 | 7/2003 | Rabie et al. | |
| 6,656,356 B2 * | 12/2003 | Gungerich et al. | 210/321.8 |
| 7,018,533 B2 | 3/2006 | Johnson et al. | |
| 7,022,231 B2 | 4/2006 | Mahendran et al. | |

(Continued)

FOREIGN PATENT DOCUMENTS

DE   100 45 227 C1   2/2002

(Continued)

OTHER PUBLICATIONS

Abstract publication O7024264, Jan. 27, 1995, Kobayashi et al., Mitsubishi Rayon Co.*

(Continued)

*Primary Examiner* — Ana M Fortuna
(74) *Attorney, Agent, or Firm* — Scott Pundsack; Borden Ladner Gervais LLP

(57) ABSTRACT

A cartridge apparatus for water treatment includes a header having a permeate cavity, a plurality of support elements spaced apart from the header, and a plurality of subgroups of hollow fiber membranes, the membranes in each subgroup having first ends potted in the header, and second ends potted in a respective one of the plurality of support elements.

13 Claims, 12 Drawing Sheets

U.S. PATENT DOCUMENTS

| | | |
|---|---|---|
| 7,037,426 B2 | 5/2006 | Pedersen |
| 7,122,121 B1 | 10/2006 | Ji |
| 7,179,370 B2 | 2/2007 | Dimitriou et al. |
| 7,255,788 B2 * | 8/2007 | Okazaki et al. ............... 210/232 |
| 2003/0038075 A1 | 2/2003 | Akimoto et al. |

FOREIGN PATENT DOCUMENTS

| | | |
|---|---|---|
| DE | 100 45 226 | 4/2002 |
| EP | 0 598 909 A1 | 6/1994 |
| EP | 0855214 A1 * | 7/1996 |
| JP | 59-147603 | 8/1984 |
| JP | 01-266258 | 10/1989 |
| JP | 07-024272 * | 1/1995 |
| JP | 7-24267 * | 7/1995 |
| JP | 07-185268 | 7/1995 |
| JP | 9-262441 | 10/1997 |
| JP | 11-128692 | 5/1999 |
| JP | 11-147028 | 6/1999 |
| JP | 11-239718 | 9/1999 |
| JP | 11-253762 | 9/1999 |
| JP | 11-319504 | 11/1999 |
| JP | 11-319505 | 11/1999 |
| JP | 11-333262 | 12/1999 |
| JP | 11-347374 | 12/1999 |
| JP | 2000-061272 | 2/2000 |
| JP | 2000-084374 | 3/2000 |
| JP | 2000-334270 | 12/2000 |
| JP | 2001-205054 | 7/2001 |
| WO | WO 02/22243 A2 | 3/2002 |
| WO | WO 02/22244 A1 | 3/2002 |
| WO | WO 02/094421 A1 | 11/2002 |

OTHER PUBLICATIONS

Abstract publicationJp62250908, Yokoyama et, Oct. 31, 1987, Asahi cemical Ind.*

Abstract JP6343837, To Guchi, Dec. 20, 1994, Ebara Infilco.*

* cited by examiner

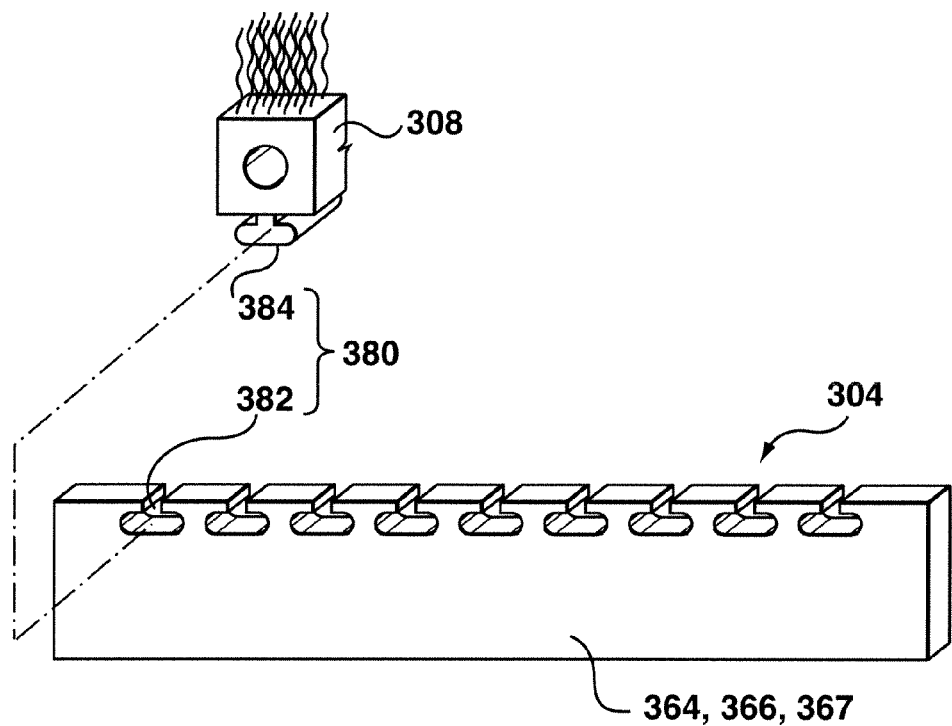
FIG. 14b
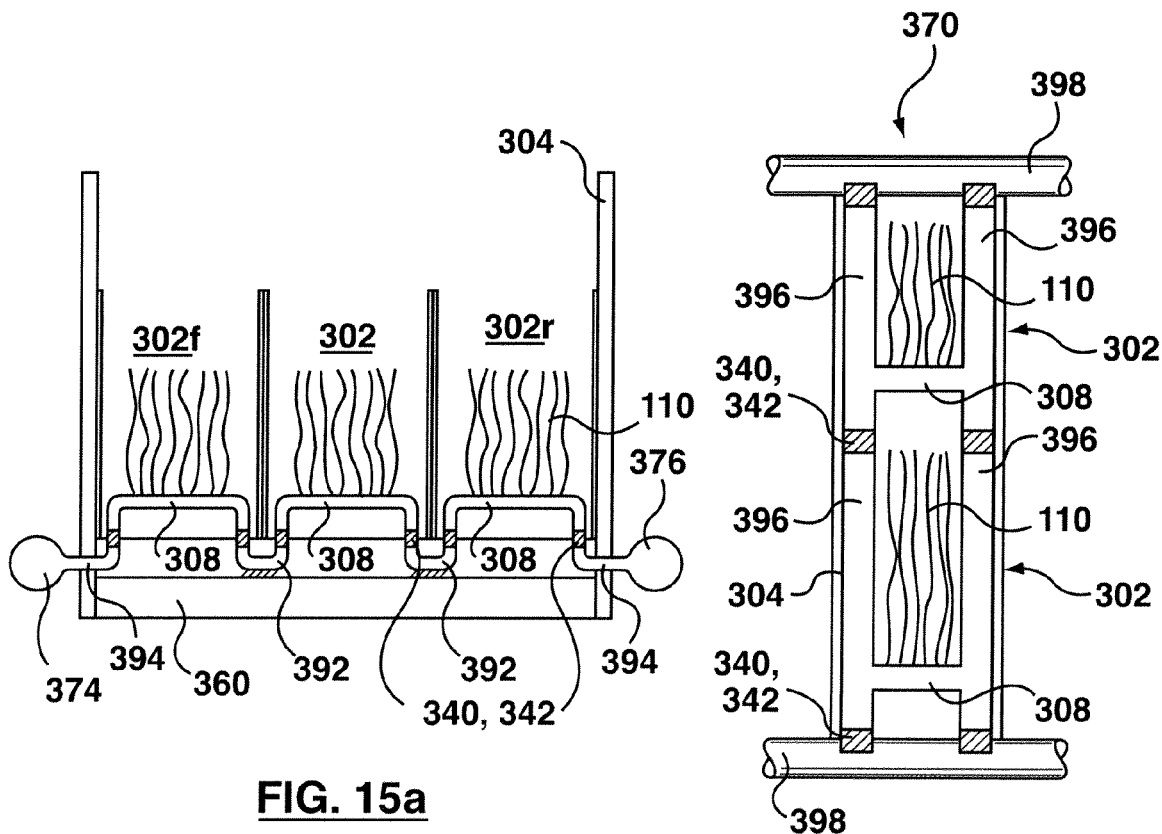
FIG. 15a
FIG. 15b

US 7,988,855 B2

MEMBRANE BIOREACTOR HAVING SINGLE HEADER MEMBRANE MODULE

This application is a continuation of prior U.S. patent application Ser. No. 10/968,883, abandoned, which was filed on Oct. 21, 2004, which is an application claiming the benefit under 35 USC 119(e) of U.S. Provisional Application No. 60/512,700, which was filed on Oct. 21, 2003, and U.S. Provisional Patent Application No. 60/614,980, which was filed on Oct. 4, 2004, the entire contents of which are incorporated herein by reference.

FIELD

The teaching disclosed herein relates to membrane modules for water treatment.

BACKGROUND

Immersed membranes are used for extracting clean water (permeate) from a tank of contaminated water or mixed liquor. The membranes are often provided in the form of assembled modules, each module having many hollow fiber membranes extending between two headers for collecting permeate that passes through pores of the membrane walls into the lumina of the membranes. Streams of air bubbles may be provided in the tank to rub against the membranes for cleaning purposes. The air bubbles also help to create circulation patterns in the tank.

Although these features improve filtration along a central portion of the length of the fibers, a dead zone remains at either end of the fibers where sufficient cleaning of the fibers and circulation of the water does not occur, thereby causing the fibers at either end to become plugged or fouled by contaminants, and resulting in a corresponding decrease in the filtration capacity of the system. Presence of the dead zone is primarily caused by the headers themselves, which interfere with the flow of air bubbles and water circulation at either end of the fibers, and which inhibit movement of the fibers since the ends of the fibers are fixed to the headers.

Efforts have been made to overcome these drawbacks associated with two-header membrane modules by using single-header modules. However, single header modules involve various issues such as supporting the fibres, aerating the fibres and building groups of modules. There is a need for improvements relating to these and other issues.

SUMMARY

It is an object of the teaching disclosed herein to provide improvements on the prior art. It is another object to provide a membrane module and elements of a membrane system and a process for a liquid with a membrane module or system. These and other objects are provided by the features described in the claims. The following summary provides an introduction to one or more inventions which may reside in a combination or sub-combination of features provided in this summary or in other parts of this document.

According to one aspect, a filtration apparatus for filtering liquid has a filtration cell which may have generally vertical front and rear panels spaced apart to define a cell length, and generally vertical side panels extending between the front and rear panels and spaced apart to define a cell width. A plurality of header segments are provided in the cell, each header segment having a permeate channel. Spaces between the header segments allow water to flow upwards into the cell. A plurality of hollow fiber membranes are associated with each header segment and extend generally upwards from the header segments, each membrane having a lumen in flow communication with the permeate channel of the associated header segment. Each membrane has a lower end secured to the associated header segment and a loose upper end.

According to a second aspect, a filtration apparatus for filtering liquid has an enclosure with a divider structure in the enclosure and dividing the enclosure into a plurality of filtration cells. Each cell has generally vertical front and rear panels spaced apart to define a cell length, and generally vertical side panels extending between the front and rear panels and spaced apart to define a cell width. A plurality of header segments are provided in each cell, each header segment having a permeate channel. A plurality of hollow fiber membranes are associated with each header segment and extend generally upwards from the associated header segment. Each membrane has a lumen in flow communication with the permeate channel of the associated header segment, a lower end secured to the associated header, and a loose upper end.

According to a third aspect, a filtration apparatus for filtering liquid has a plurality of cartridges, each cartridge defining a filtration cell and having generally vertical front and rear panels spaced apart to define a cell length, and generally vertical side panels extending between the front and rear panels and spaced apart to define a cell width. A plurality of header segments are provided in each cell, each header segment having a permeate channel and a first and second releasable resealable connection fitting at either end of the permeate channel. A plurality of hollow fiber membranes are associated with each header segment and extend generally upwards from the associated header segment. Each membrane has a lumen in flow communication with the permeate channel of the associated header, a lower end secured to the associated header segment, and a loose upper end. A frame is provided for holding the cartridges in at least one row of aligned cartridges wherein the first and second connection fittings of adjacent aligned cartridges cooperate to connect the corresponding permeate channels of the header segments of the aligned cartridges in operative fluid communication.

In any one filtration apparatus according to the first, second, or third aspects, the header segments can be elongate and aligned generally parallel to the cell length. The header segments can be arranged in spaced apart parallel relationship across the cell width, the spacing between the header segments providing a passage for a liquid to be filtered to flow upwards into the cell. The cell length can be about 10 to 40 percent longer than the cell width. The cell length can be about 20 to 30 cm, and the cell width can be about 15 to 25 cm. The apparatus can have from 2 to 4 header segments, and in particular can have three header segments. The panels can include one or more structures of the group of structures consisting of generally solid plastic plates, apertures, and horizontal rungs. The apparatus can have about 700 to 1200 membranes associated with each header segment. The membranes can be potted to the header segment in about 8 to 12 rows, each row having about 70 to 130 membranes.

The filtration apparatus, according to the third aspect, can include releasable attachments between at least one of the header segments of each cartridge and the frame, the releasable attachments allowing the frame to releasably hold the cartridges by the at least one header segment. The releasable attachments can include keys extending from the headers and slots in the frame to receive the keys in sliding fit.

According to a fourth aspect, a method for filtering liquid includes providing a filtration apparatus having (i) a filtration cell with generally vertical front and rear panels spaced apart to define a cell length, and generally vertical side panels extending between the front and rear panels and spaced apart to define a cell width, (ii) a plurality of header segments the cell, each header segment having a permeate channel, and (iii) a plurality of hollow fiber membranes associated with each header segment and extending generally upwards from the associated header segment, each membrane having a lumen in flow communication with the permeate channel of the associated header segment and a lower end secured to the associated header segment and a loose upper end. The method further includes immersing the apparatus in a liquid at ambient pressure, applying suction to the lumens to withdraw permeate, and aerating the liquid such that fluid currents rise upwards along the outer surfaces of the hollow fiber membranes, urging the membranes to a generally vertical position when aerated.

According to a fifth aspect, a method for filtering liquid includes providing a filtration apparatus having (i) an enclosure, (ii) a divider structure in the enclosure and dividing the enclosure into a plurality of filtration cells, each cell having generally vertical front and rear panels spaced apart to define a cell length, and generally vertical side panels extending between the front and rear panels and spaced apart to define a cell width, (iii) a plurality of header segments in each cell, each header segment having a permeate channel, and (iv) a plurality of hollow fiber membranes associated with each header segment and extending generally upwards from the associated header segment, each membrane having a lumen in flow communication with the permeate channel of the associated header segment and a lower end secured to the associated header and a loose upper end. The method for filtering a liquid further includes immersing the apparatus in a liquid at ambient pressure, applying suction to the lumens to withdraw permeate, and aerating the liquid such that fluid currents rise upwards along the outer surfaces of the hollow fiber membranes, urging the membranes to a generally vertical position when aerated.

According to a sixth aspect, a method for filtering liquid includes providing a filtration apparatus having (i) a plurality of cartridges, each cartridge defining a filtration cell and having generally vertical front and rear panels spaced apart to define a cell length, and generally vertical side panels extending between the front and rear panels and spaced apart to define a cell width, (ii) a plurality of header segments in each cell, each header segment having a permeate channel and a first and second releasable resealable connection fitting at either end of the permeate channel, (iii) a plurality of hollow fiber membranes associated with each header segment and extending generally upwards from the associated header segment, each membrane having a lumen in flow communication with the permeate channel of the associated header and a lower end secured to the associated header segment and a loose upper end, and (iv) a frame for holding the cartridges in at least one row of aligned cartridges wherein the first and second connection fittings of adjacent aligned cartridges cooperate to connect the corresponding permeate channels of the header segments of the aligned cartridges in operative fluid communication. The method for filtering a liquid further includes immersing the apparatus in a liquid at ambient pressure, applying suction to the lumens to withdraw permeate, and aerating the liquid such that fluid currents rise upwards along the outer surfaces of the hollow fiber membranes, urging the membranes to a generally vertical position when aerated.

In any one of the filtration methods according to the fourth, fifth, and sixth aspects, the aeration can be intermittent, having a supply of air that is cycled on and off in cycles of between about 15 and 120 seconds in duration. Furthermore, the cycle time for which the air supply for aeration is off can have a duration limited to not more than 30 seconds.

According to a seventh aspect, a filtration apparatus for filtering liquid includes a filtration cell having a perimeter defined by generally vertical panels. A plurality of header segments are provided in the cell, the header segments oriented in spaced relationship providing a passage between the header segments for a liquid to be filtered to flow upwards into the cell, and each header segment having a permeate channel. A plurality of hollow fiber membranes are associated with each header segment and extend generally upwards from the associated header segment, each membrane having a lumen in flow communication with the permeate channel of the associated header segment and a lower end secured to the associated header segment and a loose upper end.

BRIEF DESCRIPTION OF THE DRAWINGS

For a better understanding of the teaching disclosed herein and to show more clearly how it may be carried into effect, reference will now be made by way of example, to the accompanying drawings in which:

FIG. 14b is an exploded view showing a portion of the apparatus of FIG. 11 in greater detail.

FIG. 15a side view of an optional embodiment of the apparatus of FIG. 7;

FIG. 15b is a side view of another optional embodiment of the apparatus of FIG. 7;

DETAILED DESCRIPTION

Figure 1:
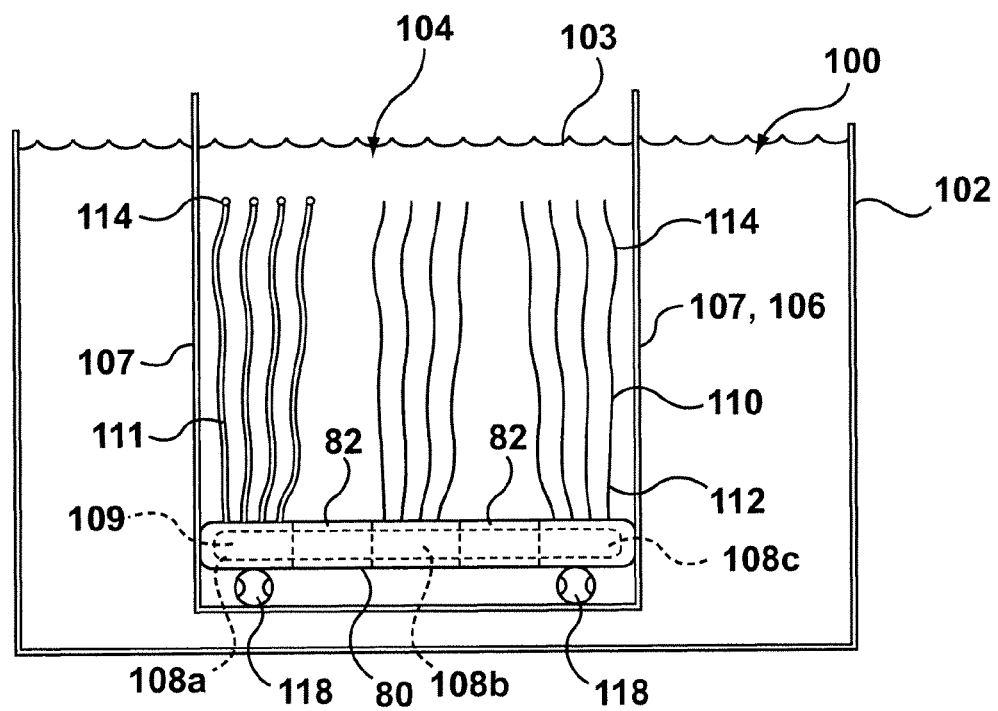
FIG. 1 is a front view of a filtration apparatus.

A filtration apparatus is shown generally at 100 in FIG. 1. In FIG. 1, the apparatus 100 is shown in combination with a tank 102 that contains liquid 103 from which filtered water (permeate) is to be withdrawn. The tank 102 may be part of a bioreactor, a drinking water filtration plant, or another type of solid/fluid separation system. In some applications, providing a tank 102 may not be required. For example, the apparatus 100 may be a self-contained unit holding liquid 103. Alternately, the apparatus 100 may be co-extensive with a tank or used in an apparatus and/or process as described in PCT Patent Application No. PCT/CA00/01354, published as WO 01/36075 which is incorporated herein in its entirety by this reference to it.

Figure 2:
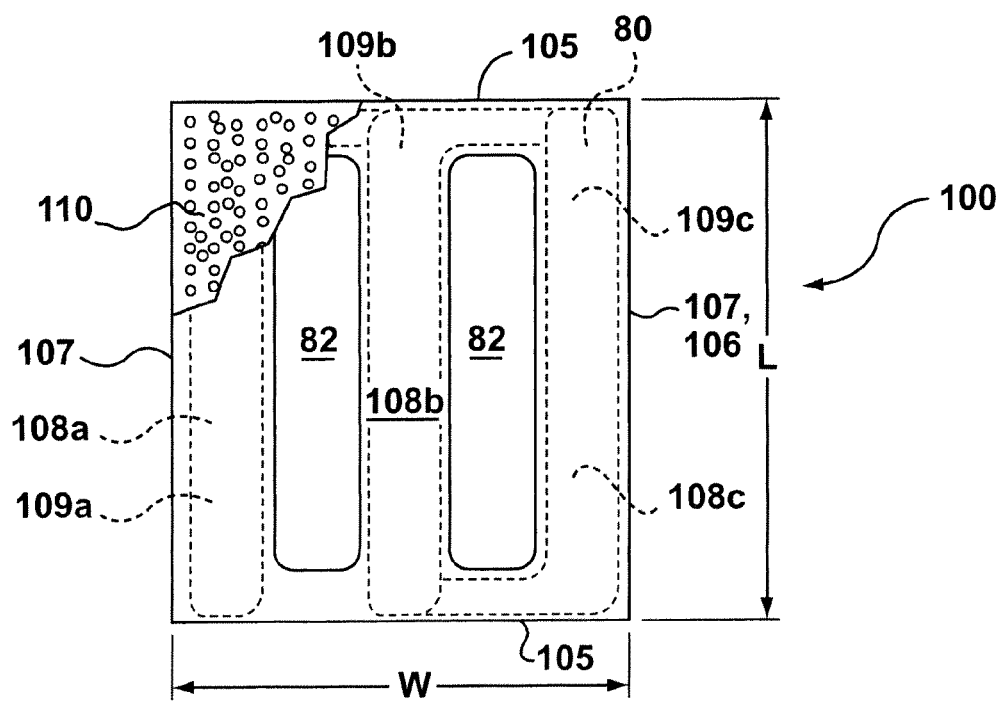
FIG. 2 is a top view of the apparatus of FIG. 1.

The apparatus 100 has a housing 106 with vertical side panels that define a filtration cell. More specifically, the housing 106 has opposed vertical end panels 105, and vertical side panels 107 extending between the end panels 105 (FIG. 2). The top and bottom faces of the housing 106, as well as the sides, can present openings to allow liquid 103 to circulate through the interior space of the housing 106. The panels 105, 106 can comprise plastic plates, plates with apertures, or rungs of string, wire, plastic or other material.

The apparatus 100 is further provided with a plurality of header segments 108, each having a plurality of hollow fiber membranes 110 extending therefrom. The header segments have permeate collection channels 109 for collecting permeate from the membranes 110, as discussed further hereinafter.

Various constructions and dimensions of membranes 110 and headers 108 are possible for obtaining satisfactory results with the apparatus 100 of the present invention. It has been determined that particularly satisfactory filtration results may be obtained by using generally narrow, elongate header segments to form rectangular skeins of vertically oriented membranes 110. Such a configuration permits close-packing of a plurality of skeins to efficiently use the available space in the tank for filtration, while allowing adequate penetration of aeration bubbles to interior fibers. Narrow spacing can be provided between adjacent skeins to permit efficient aeration and circulation around the membranes 110 of the apparatus 100.

Accordingly, in the embodiment illustrated, three header segments 108a, 108b and 108c, are provided in the cell 104. The header segments 108 are elongate and are oriented generally horizontally and parallel to each other, extending between the opposed end panels 105 of the housing 106. In particular, the header segments 108 in the illustrated embodiment have dimensions of about 6 cm high by 4 cm wide by 25 cm long. The header segments 108 are spaced apart by about 3 cm.

The header segments 108 need not be separate header elements, but may be distinct portions of a single header. In the embodiment illustrated in FIGS. 1 and 2, the three header segments 108a, 108b, and 108c are part of a larger single header element 80 which fits snugly within the housing 106 of the cell 104. Two elongate apertures 82 are provided in the header 80, extending across the header 80 in parallel spaced-apart relationship. The spaces between and on either side of the apertures 82 define the header segments 108a, 108b, 108c. Each header segment 108a, 108b, 108c may be provided with a distinct permeate channel 109a, 109b, 109c, respectively, for example, as convenient for potting the membranes by a fugitive potting method as described in U.S. Pat. No. 5,639,373 which is incorporated herein in its entirety by this reference to it.

A plurality of hollow fiber membranes 110 extends upwardly from each of the header segments 108. The membranes 110 are flexible, tube-like elements, each having a hollow interior channel or lumen 111 and a water permeable wall structure. Each membrane 110 is secured to its associated header segment 108 such that the lumen 111 is in flow communication with the permeate collecting channel 109 of the header segment 108.

In the illustrated embodiment, the membranes 110 are of a braid reinforced construction, having a tubular braided inner layer that is coated with a coagulated film-forming polymer. Further details of such membranes can be found in U.S. Pat. No. 5,472,607 (Zenon Environmental Inc.), which is incorporated herein in its entirety by this reference to it. The membranes 110 can have an outer diameter of about 2.3 mm, and a length of about 160 cm. This configuration provides membranes 110 that are flexible and nearly buoyant so that they stand generally upright in the liquid 103 when aerated, and can sway back and forth under the influence of currents in the liquid 103, despite having some stiffness to inhibit their collapse when not aerated.

The membranes 110 have lower ends 112 that are secured to the header segments 108, and upper ends 114 that are loose. As mentioned previously, the header segments 108 each have a hollow channel 109 for collecting permeate. The lower ends 112 of the membranes 110 are secured to the header segments 108 such that the lumens 111 of the membranes 110 are in flow communication with the permeate collecting channels of the header segments 108. In the illustrated embodiment, the lower ends 112 of the membranes 110 are potted in the header segments 108 using known potting techniques. The membranes 110 are potted in rows of about 9 by 100 membranes 110 along the upper surface of the header segments 108.

The upper ends 114 of the membranes 110 are loose, meaning that they are not secured in a fixed position relative to the housing 106 of the cell 104 or to a fixed upper header, but are able to sway back and forth. The loose upper ends 114 may be free from connection to any other member of the apparatus 100, or the ends 114 may be tethered to each other and to the housing 106. In this embodiment, the upper ends 114 of the membranes are free, having no connection to other membranes or to any fixed structural number. Other configurations of the loose upper ends 114 of the membranes 110 will be described hereinafter.

Figure 3:
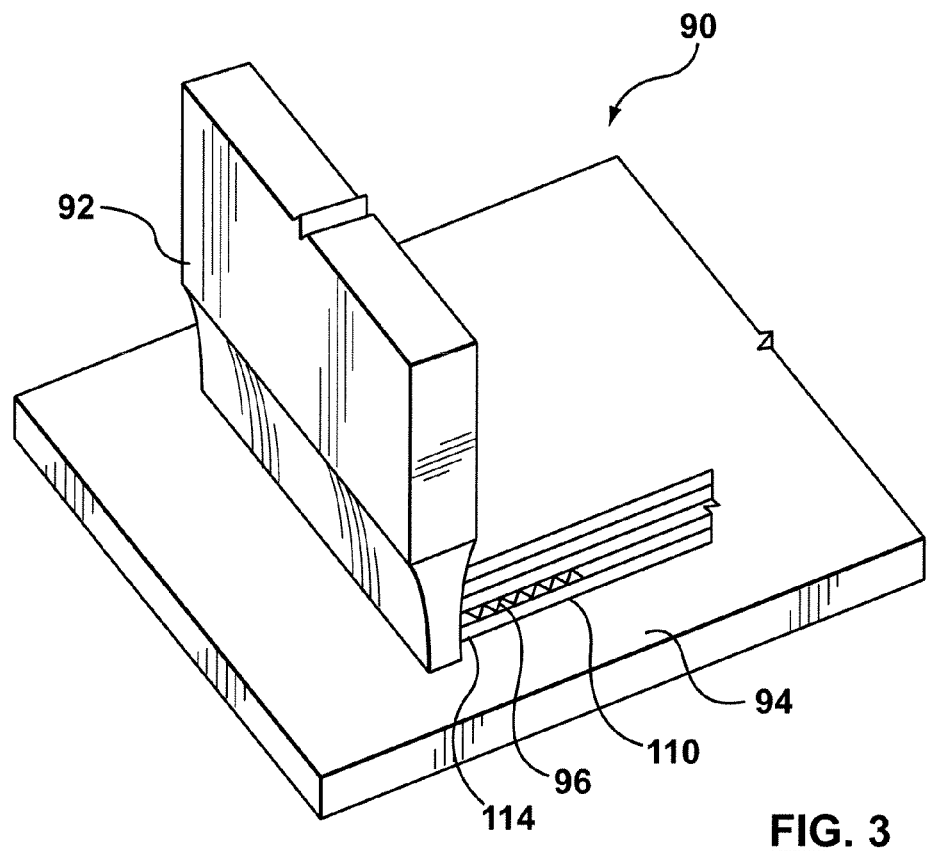
FIG. 3 is a partial perspective view of an apparatus for sealing membrane ends.

The upper ends 114 of each individual membrane 110 may be plugged, sealed, or otherwise obstructed to prevent the flow of raw liquid 103 into the lumens of the membranes 110. In the illustrated embodiment, the upper ends 114 of the membranes 110 are sealed by subjecting the ends 114 to ultrasonic waves and squeezing or pinching the ends 114 closed. In particular, as best seen in FIG. 3, an ultrasonic machine 90 with a 1.3 cm by 25 cm horn 92 can be used to seal about 20 to 30 fiber membranes 110 simultaneously. The fiber membranes 110 can be pre-wetted and evenly positioned on a receiving plate 94 having spacers 96, prior to sealing. Alternately, the fibre membranes 110 can be distributed randomly in the receiving plate 94 and some connection between adjacent membranes 110 tolerated.

The filtration apparatus 100 can advantageously be provided with aerators 118 for providing streams of air bubbles directed upwards along the outer surfaces of the hollow fiber membranes 110. In the embodiment illustrated, two aerators 118 are provided, positioned below and between the pairs of headers 108a, 108b, and 108b, 108c. Other locations and numbers of aerators may also be used. Further, the header 108 may be adapted to form part of an inverted air box aerator used in conjunction with continuous cyclic air as described in U.S. application Ser. No. 10/171,997 which is incorporated herein in its entirety by this reference to it. The air bubbles can be provided continuously or cyclically as described in U.S. Pat. No. 6,550,747 which is incorporated herein in its entirety by this reference to it.

During normal operation of the filtration apparatus 100, a pressure gradient (or trans-membrane pressure) is applied across the walls of the hollow fiber membranes, such that the liquid 103 side of the membranes is at a higher pressure than the permeate side of the membranes. For example, the trans-membrane pressure may be provided by suction on the lumens. As a result, permeate is drawn from the liquid 103 through the porous layers of the hollow fiber membranes 110 and into the lumens 111. The permeate is then collected by the header segments 108. The streams of air bubbles from the aerators 118 help to keep the membranes from becoming plugged or fouled by scrubbing the outer surfaces of the membranes, and by inducing flow currents in the liquid 103 that circulate liquid 103 with more concentrated contaminant levels away from the fibers 110, being replaced by liquid 103 with less concentrated contaminant levels. Aeration may be provided continuously or intermittently.

The panels 105, 107 of the housing 106 of each cell 104 corral or fence-in a group 124 of membranes 110. The group 124 of membranes 110 is supported in a generally upright configuration by the housing 106. The vertical panels 105, 107 of the housing 106 of the cell 104 provide support surfaces that limit the lateral distance that the membranes 110 can curl under the force of gravity when no liquid 103 surrounds the membranes 110 or when they are not aerated.

Figure 4:
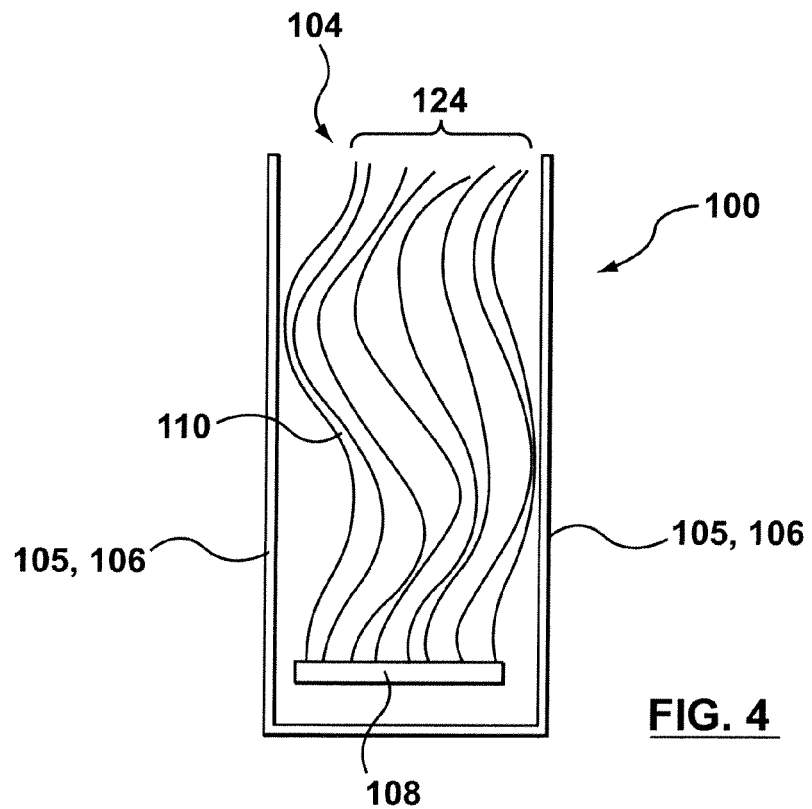
FIG. 4 is a side view of the apparatus if FIG. 1.

An example of the support provided to the groups 124 of hollow fiber membranes 110 by the housing 106 is shown in FIG. 4. In particular, it has been observed that when the tank 102 contains no liquid 103 or the membranes are not aerated, the hollow fiber membranes 110 curl into a generally "s"-shaped or similarly curved configuration. By suitably spacing the panels 105, 106 apart from each other in relation to the headers 108, the curved portions at either horizontal boundary of the "s"-shaped configuration of each group 124 of membranes 110 contact and lean against the housing 106. Each group 124 of membranes 110 can wind its way back and forth between, and in contact with, the housing 106 of the cell 104. In this way the group 124 of membranes 110 is supported by the housing 106 so that the membranes 110 remain satisfactorily unentangled and in a generally upright orientation.

It has been determined that the spacing apart of the panels 105, 107 of the housing 106 requires careful consideration to achieve optimal results with the apparatus 100 of the present invention. If the panels 105, 107 are spaced too far apart, entanglement of the membranes 110 may not be sufficiently alleviated. Also, too great a space between the partitions 121 may reduce the effectiveness of aeration supplied in the apparatus 100, since streams of air bubbles emitted from the aerators may more easily disperse horizontally, particularly since the upper ends 114 of the membranes 110 are loose. If the panels 105, 107 are spaced too closely together, the swaying motion of the membranes 110 may be reduced, and it may be more difficult to circulate highly contaminated water away from the membranes 110. This may increase the susceptibility of the membranes 110 to becoming fouled with contamination. The total number of cells and panels is also increased unnecessarily.

It has been determined that satisfactory results can be obtained for the apparatus 100 having headers 108 and membranes 110 as described above, using rectangular shaped cells 104 having a width W and a length L. The width W can be sized to accommodate from 2 to 4 header segments 108, spaced apart as described above. The length L can be sized to be slightly greater than the selected width. The width W, being perpendicular to the axis of the header segments 108, is advantageously smaller than the length L because the membranes tend to collapse into the space between the header segments 108.

In the embodiment illustrated, each cell 104 of the apparatus 100 has a length L of about 30 cm and a width W of about 25 cm. Each cell 104 holds three header segments 108 and a group 124 of membranes 110 having about 2700 hollow fiber membranes 110.

It will be appreciated that the shape of the apparatus 100 facilitates the efficient packing of multiple filtration elements 100 in a side-by-side arrangement to obtain a desired filtration capacity. Furthermore, the filtration capacity provided by the apparatus 100, either singly or in multiple elements, provides an efficient use of space, i.e. high filtration capacity for a given sized tank 102.

Figure 5:
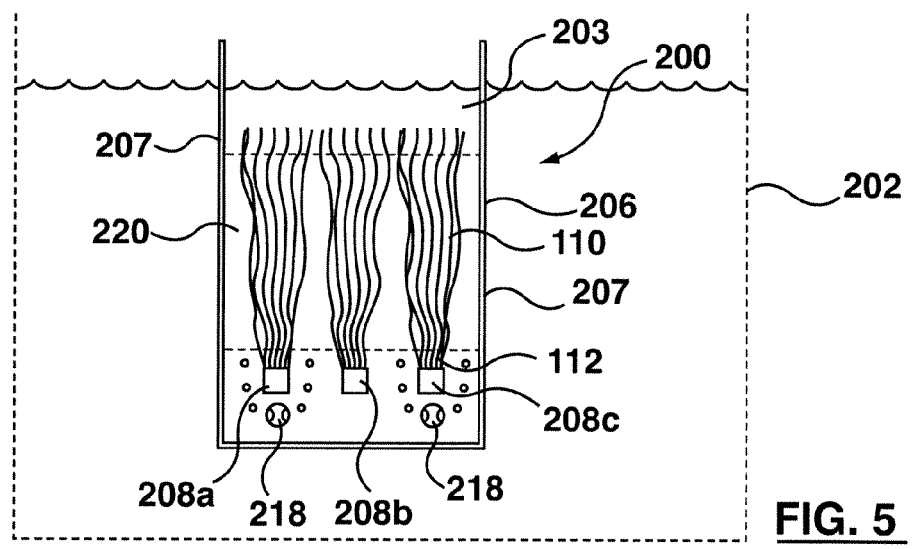
FIG. 5 is a front view of another embodiment of a filtration apparatus, shown in combination with a tank containing liquid.
Figure 6:
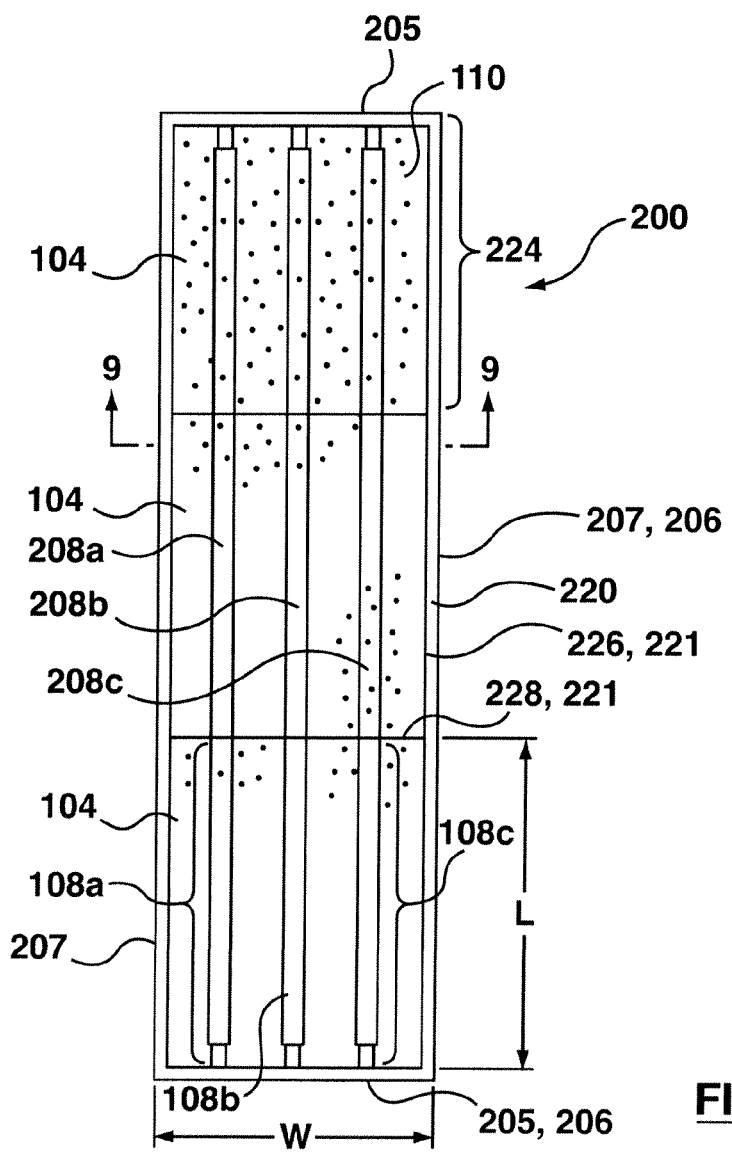
FIG. 6 is a top view of the apparatus of FIG. 5.

Referring now to FIGS. 5 and 6, an alternative embodiment of a filtration apparatus according to the present invention is shown generally at 200. The filtration apparatus 200 has an enclosure 206 which can contain or be immersed in liquid 103. The enclosure 206 has opposed vertical end plates 205 and side plates 207 extending between the end plates (FIG. 5). The top and bottom faces of the enclosure 206 can be open to facilitate the circulation of liquid 103 from a tank 102 when the apparatus is used in a tank immersion configuration.

Three headers 208a, 208b and 208c are provided in the illustrated embodiment of the apparatus 200. The headers 208 are arranged in parallel in the enclosure 206, each extending between the opposed end plates 205. A plurality of hollow fiber membranes 110 extend from each header 208.

The apparatus 200 is fitted with a divider structure 220 having generally vertical partitions 221 that divide the interior space of the housing 206 into a plurality of fenced cells 104. The partitions 221 of the divider structure 220 can by themselves or in combination with the plates 205, 207 provide the panels 105, 107 of the housing 106 for each cell 104. In other words, the partitions 221 of the divider structure 220 can comprise unique longitudinal panels 226 and transverse panels 228 to define the housing 106 of the cells 104, or alternatively, the partitions 221 can comprise some unique panels 226, 228 and some panels 205, 207 of the enclosure 206 to define the cells 104. Some unique panels 226, 228 of the divider structure 220 can be provided in flush contact with panels 205, 207 of the enclosure 206 to provide additional support and reinforcement for the enclosure 206 and cells 104.

As best seen in FIG. 6, about one third the length of each of the headers 208a, 208b, 208c are contained within each cell 104 formed by the partitions 221 of the divider structure 220. Accordingly, each third of the headers 208a, 208b, 208c provides a separate and distinct header segment 108a, 108b, and 108c for each cell 104 while requiring only 3 potting operations. It is to be understood that the headers 208 may extend below the lower edges 236 (FIG. 7) of the transverse panels 228 of the divider structure 220, but that the segments of the headers 208 defining the header segments 108 associated with the cells 104 are nevertheless considered to be part of the corresponding cells 104.

Figure 7:
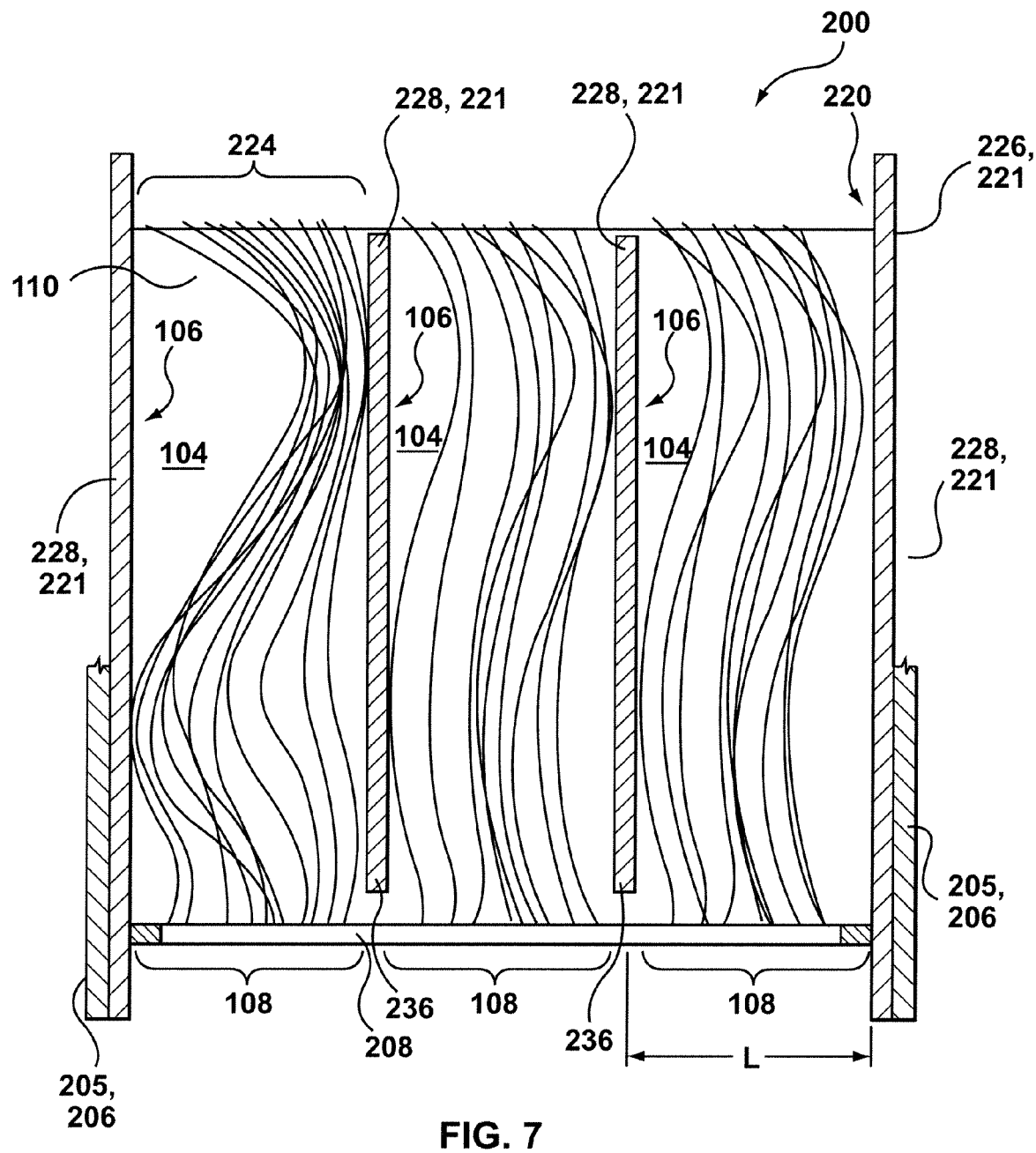
FIG. 7 is a side view of the apparatus of FIG. 5.

As best seen in FIG. 7, the partitions 221 of the divider structure 220 form the housing 106 for the cells 104. Each cell 104 contains a group 224 of membranes 110, and the housing 106 of each cell 104 supports the group 224 of membranes in a generally upright orientation. As described earlier for the cell 104 in FIG. 4, the hollow fiber membranes 110 curl into a generally "s"-shaped or similarly curved configuration when the no liquid 103 surrounds the membranes 110, or when the membranes 110 are not aerated. The partitions 221 of the divider structure 220 (comprising panels 105, 106 of the housing 106 of each cell 104) are spaced so that the curved portions at either horizontal boundary of the "s"-shaped configuration of each group 224 of membranes 110 contact and lean against the panels 221. Each group 224 of membranes 110 can wind its way back and forth between, and in contact with, the housing 106 of the cell 104. In this way the group 224 of membranes 110 is supported by the housing 106 so that the membranes 110 remain satisfactorily unentangled and in a generally upright orientation.

Figure 8:
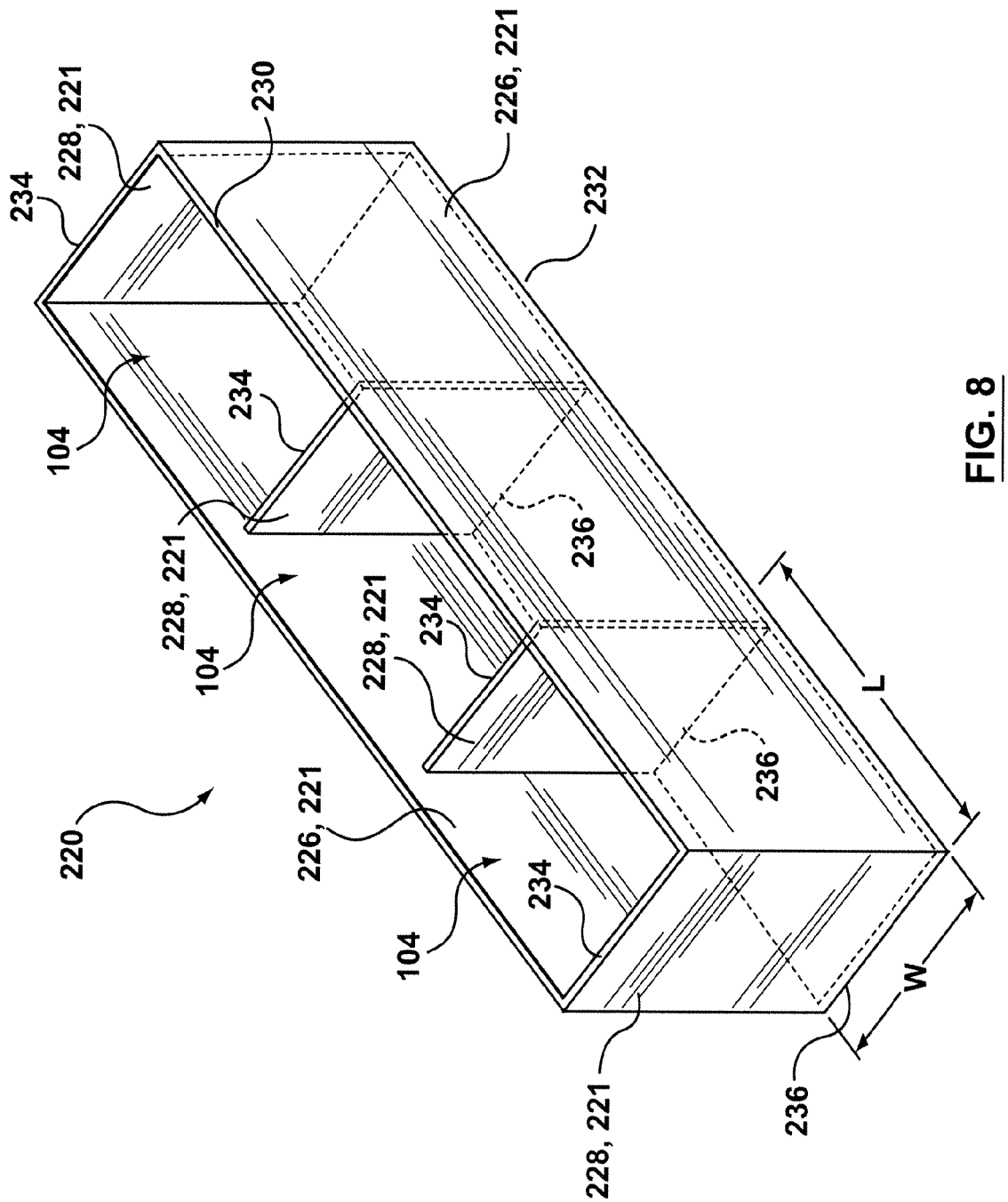
FIG. 8 is a perspective view of a divider structure of FIG. 5.

Referring now to FIG. 8, further details of the divider structure 220 will be provided. In the embodiment illustrated, the divider structure 220 has generally vertical partitions 221 comprising longitudinal and transverse panels 226 and 228, respectively. The partitions 226, 228 may be individual panels fastened together to form an assembled divider structure 220, or the panels 226, 228 may be integrally formed by, for example, an injection moulding process, to produce a unitary divider structure 220.

The longitudinal panels 226 can be in the form of plastic panels, having upper and lower edges 230 and 232, respectively. The transverse panels 228 can also be plastic panels, having upper and lower edges 234 and 236 respectively. The upper edges 230 and 234 of the panels 226, 228 need not lie in the same horizontal plane, but can be offset. In particular, the upper edges 234 of the transverse panels 228 can be lower than the upper edge 230 of the longitudinal panels 226 so that circulation of liquid 103 between adjacent cells 104 is facilitated. Similarly, the lower edges 232 and 236 can be offset from each other to enhance flow characteristics between adjacent cells 104.

Figure 9:
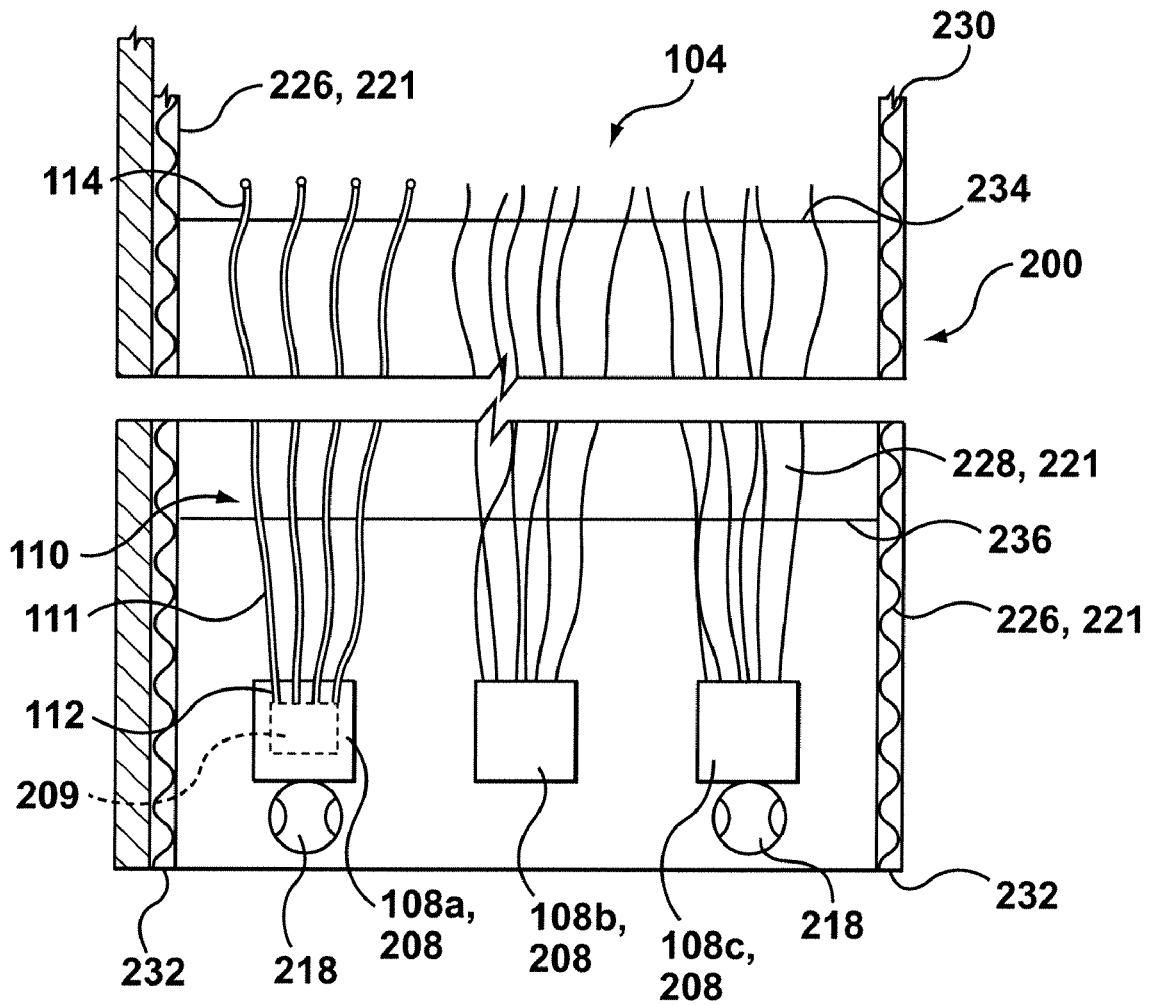
FIG. 9 is a front sectional view of FIG. 6 taken along the lines 9-9.

Referring now to FIG. 9, the lower edges 232 of the longitudinal panels 226 of the illustrated embodiment of the apparatus 100 extend below the vertical position of the headers 208 and aerators 218 in the tank 102. The lower edges 236 of the transverse panels 228 are positioned above the headers 208 and aerators 218.

By having the lower edges 232 of the longitudinal divider panels 226 extend below the aerators 218, the stream of air bubbles emitted from the aerators 218 remains confined in a narrower vertical channel which can improve the cleaning action of the membranes 110 by the air bubbles as they travel upwards in the tank 102.

The apparatus 200 may have the aerators 218 situated below the headers 208 (as shown in FIG. 5), or in an alternate position above the headers 108 (as shown in FIG. 8). By positioning the aerators 218 slightly above the top surface of the headers 208, as shown in FIG. 8, the dead zone above the headers 208 may be further reduced in some embodiments.

The apparatus 200 can be advantageously supported above the bottom of the tank 102 to further facilitate circulation of liquid 103 through the housing 206 of the apparatus 200, or to provide a sludge collection and removal zone in the tank 102 below the apparatus 200.

Figure 10A:
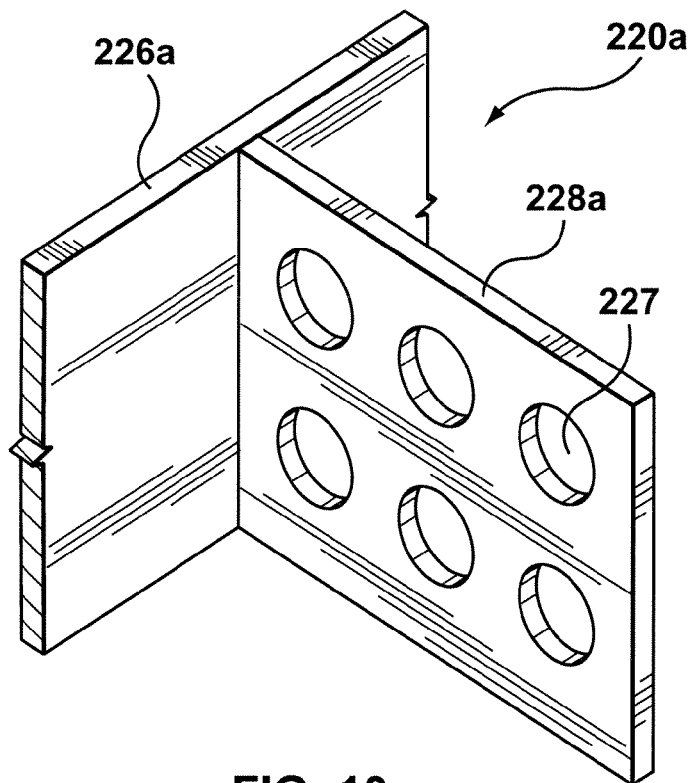
FIGS. 10a and 10b are perspective views showing optional embodiments of the structure of FIG. 8.
Figure 10B:
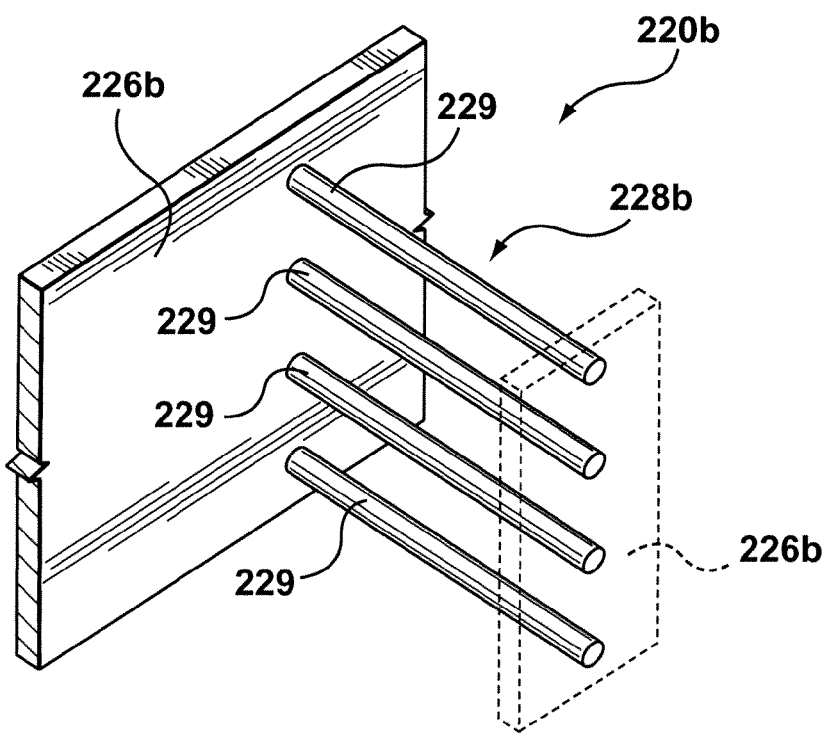

Referring now to FIG. 10a, an alternate divider structure 220a has transverse divider panels 228a having apertures 227 therethrough. In FIG. 10b, another alternate divider structure 220b has transverse panels 228b comprised of spaced apart horizontal rungs 229. The rungs 229 can be constructed of wire or yarn, and may be of the same material as the hollow fiber membranes 210. The alternate divider structures 220a and 220b can advantageously facilitate fluid communication between cells 104 on either side of the partitions 221.

Figure 11:
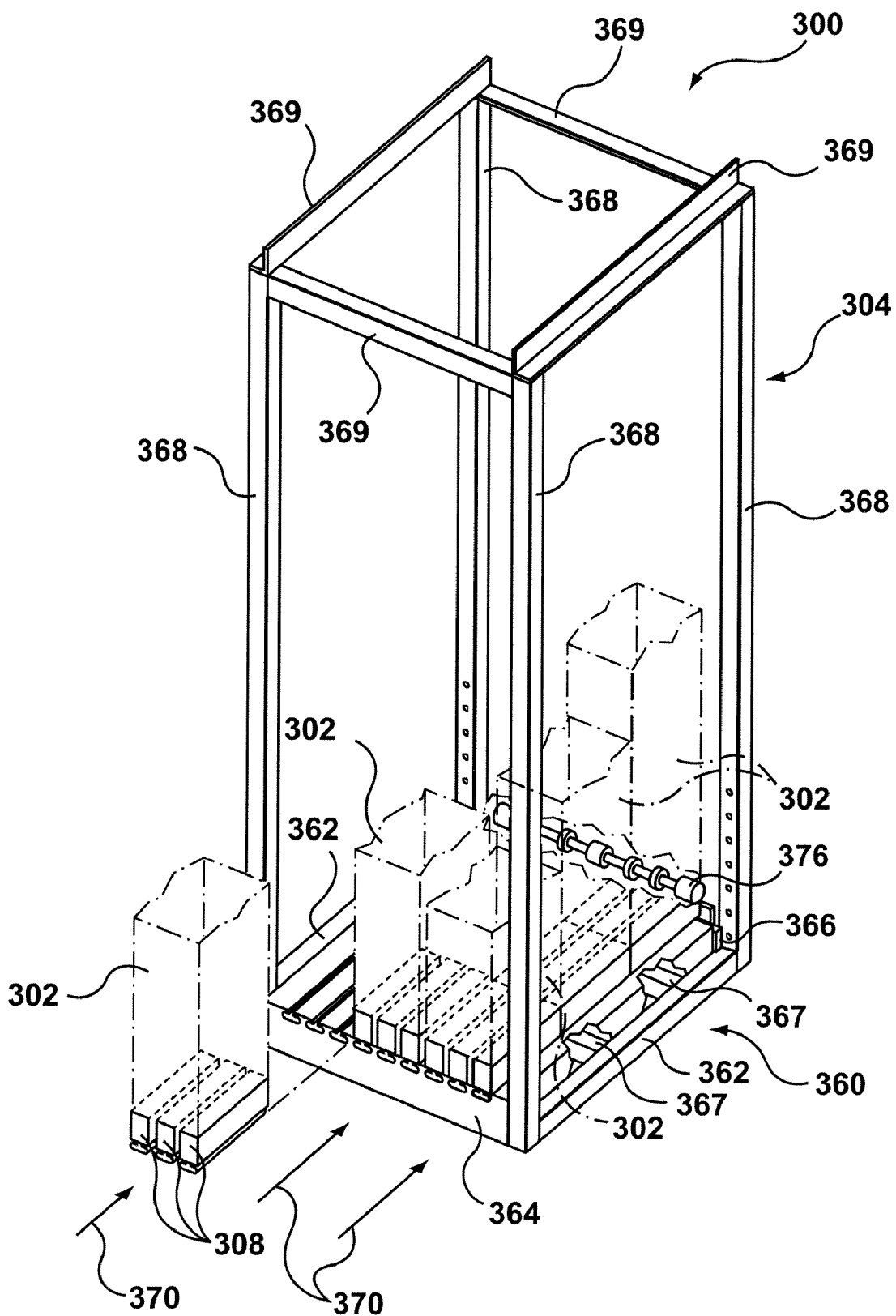
FIG. 11 is a perspective view of an alternate embodiment of a filtration apparatus.

Another alternate embodiment of a filtration apparatus is shown generally at 300 in FIG. 11. The filtration apparatus 300 has a plurality of filtration cartridges 302 supported by a frame 304. Each cartridge 302 generally corresponds to a single cell 104 of the apparatus 100, and multiple cartridges 302 can be packed together side-by-side to obtain a desired filtration capacity.

Figure 12:
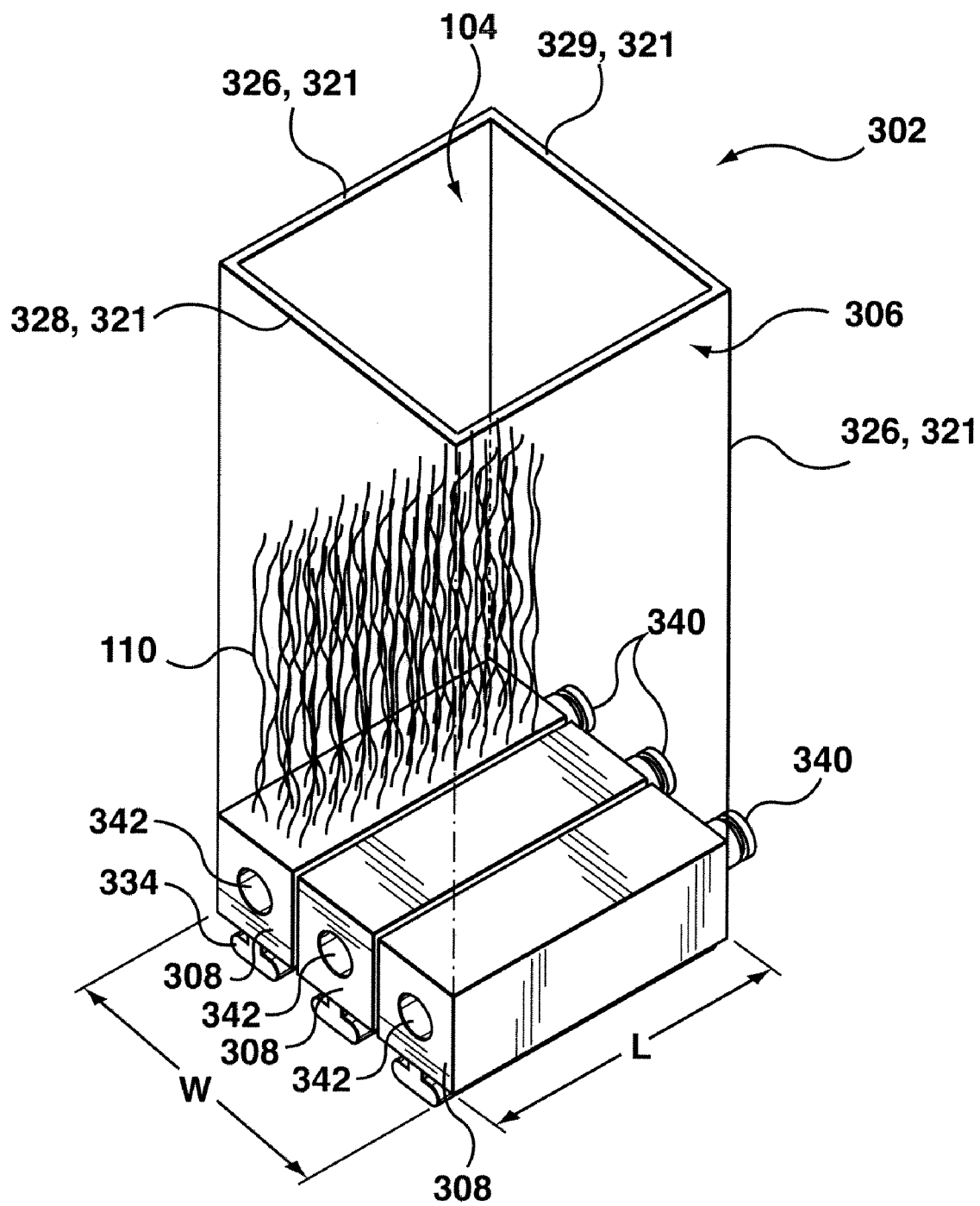
FIG. 12 is a perspective view of a single cartridge of the apparatus of FIG. 11.

Details of the cartridge 302 are best seen in FIG. 12. Each cartridge 302 has a housing 306 that comprises generally vertical panels 321. The housing 306 of each cartridge 302 corresponds to the housing 106 of each cell 104. In the embodiment illustrated, the panels 321 of the housing 306 include longitudinal side panels 326, and front and rear transverse panels 328, 329 respectively. The housing 306 has a length L of 25 cm and a width W of 20 cm.

Figure 13:
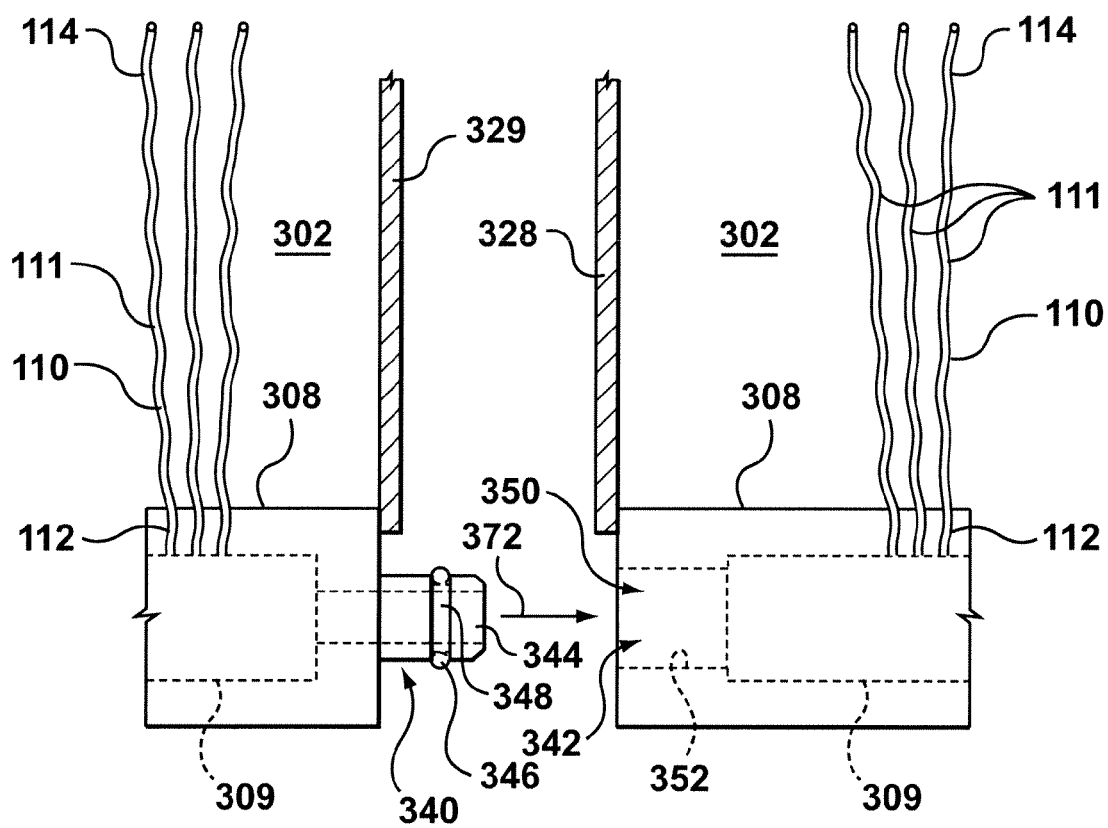
FIG. 13 is side view showing portions of two adjacent cartridges of FIG. 12 in greater detail.

Each cartridge 302 further has a plurality of header segments 308 in the housing interior. In the embodiment illustrated, each header segment 308 is elongate and has a permeate channel 309 extending through the header segment 308 (FIG. 13). First and second releasable resealable connection fittings 340 and 342, respectively, are provided at either end of the permeate channels 309 of each header segment 308. Further details of the connection fittings 340, 342 are provided hereinafter.

A plurality of hollow fiber membranes 110 are associated with each header segment 308 in each cartridge 302. The membranes 110 extend generally vertically when aerated between the panels 321 of the housing 306. The membranes 110 of each plurality of membranes are in flow communication with the permeate channel 309 of the corresponding associated header segment 308. The membranes 110 have lower ends 112 secured to the header segments 308, and loose upper ends 114, as described previously. In the embodiment illustrated, the upper ends 114 of the membranes 110 are free.

Referring again to FIG. 11, the frame 304 for holding the cartridges 302 of the apparatus 300 has a base 360 with longitudinal side members 362 and transverse front and back members 364, 366, respectively. The frame 304 can have additional intermediate transverse members 367 positioned parallel to, and spaced between, the front and back members 364, 366. In addition, the frame 304 can be provided with uprights 368 and upper braces 369, if desired, for reinforcing the apparatus 300 and further supporting the upper portions of the housings 306 of the cartridges 302.

The base 360 of the frame 304 is sized to hold the cartridges 302 in at least one row 370 of aligned cartridges 302. In the illustrated embodiment, three rows 370 of three aligned cartridges 302 are held in the frame 304. In each row 370 of aligned cartridges 302, the header segments 308 of each cartridge 302 extend parallel to the row 370, and the first and second connection fittings 340, 342 of adjacent cartridges 302 cooperate to connect the corresponding permeate channels 309 of the header segments 308 of the aligned cartridges 202 in operative fluid communication.

More specifically, as best seen in FIG. 13, the first connection fitting 340 can have an axially extending male fitting 344 with an o-ring 346 seated in an o-ring groove 348. The second fitting 342 can comprise a female fitting 350 having an axial bore 352, the inner surface of which is shaped to engage the o-ring 346 of the first connection fitting 340 to provide a sealed connection between the permeate channels 309 of the adjacent headers 308.

Figure 14A:
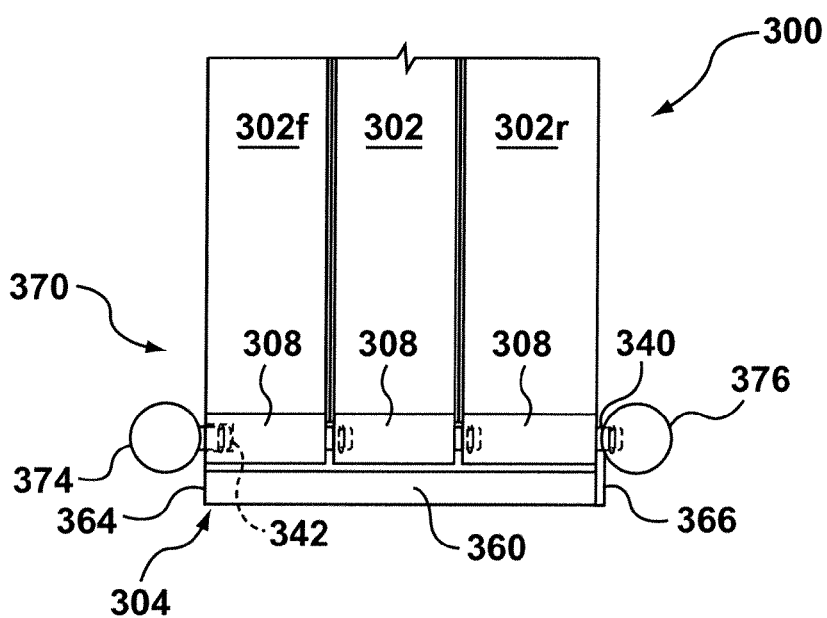
FIG. 14a is a side view of the apparatus of FIG. 11.

To pack or assemble multiple cartridges 302 into filtration units of larger capacity, rows 370 of cartridges 302 can easily be formed by aligning the connection fittings 340, 342 of two adjacent cartridges 302 and moving the cartridges together in the direction of arrow 372 in FIG. 13. This procedure can be repeated with additional cartridges 302 to form a row 370 of a desired length. For example, an assembled row 370 of three cartridges 302 can be seen in FIG. 14a.

Referring again to FIG. 14a, each row 370 of cartridges 302 will have a front cartridge 302f adjacent the front member 364 of the frame 304, and a rear cartridge 302r adjacent the rear member 366 of the frame 304. Accordingly, first connection fittings 340 are exposed towards the rear of the frame 304, and second connection fittings 342 are exposed towards the front to the frame 304. A permeate pipe 376 having transverse connection fittings 342 along its length can conveniently be provided adjacent the rear member 366 of the frame 204 to connect with the exposed connection fittings 242 of the rear cartridges 302r. Similarly, a permeate pipe 374 having transverse connection fittings 344 along its length can be provided adjacent the front member 364 of the frame 304 to connect with the exposed connection fittings 342 of the front cartridges 302f. The permeate pipes 374, 376 can further facilitate the assembly of a filtration unit having a desired capacity.

Referring now to FIG. 14b, the apparatus 300 can further be provided with releasable attachments 380 between the header segments 308 of the cartridges 302 and the frame 304. The releasable attachments 380 can permit the frame 304 to releasably hold the cartridges 304 by the header segments 208. This can facilitate removal and installation of the cartridges 302 in the frame 304 at times of, for example, maintenance of the apparatus 300.

In the embodiment illustrated, the releasable attachments 380 comprise T-shaped slots 382 provided in the transverse members 364, 366, 367 of the base 360 of the frame 304. Matching keys 384 are provided on the underside of the header segments 308 so that the cartridges 302 can be assembled to the frame 304 by sliding the keys 384 into the slots. As well, releasable clamps (not shown) can be provided to clamp the cartridges 302 to the frame 304.

As best seen in FIG. 15a, the cartridges 302 can be adapted to permit vertical assembly into the frame 304 of the apparatus 300. In particular, the header segments 308 can be provided with down-turned ends 390 that engage U-shaped couplers 392 supported by the base 360 of the frame 304 at a location below and between adjacent cartridges 302. The exposed ends of the foremost and rearmost cartridges 302f, 302r can be coupled to permeate pipes 374, 376 using elbow couplers 394. Releasable, resealable connection fittings 304, 342 can be provided between the header segments 308 and couplers 392, 394.

As best seen in FIG. 15b, the cartridges 302 can also be adapted to permit formation of vertical rows 370. In this embodiment, the cartridges 302 are fitted with vertical permeate tubes 396 at either end of the header segments 308. The vertical tubes 396 are in flow communication with the header segments 308, and extend the full height of the cartridge 302 so that the tubes 396 of vertically adjacent cartridges 302 in the row 370 can engage each other in flow communication. Upper and lower permeate collection pipes 398 can be provided to engage the exposed upper and lower ends of the tubes 396 of the cartridges 302 in the row 370. Releasable resealable connection fittings 340, 342 can be provided between adjacent tubes 396 and between the tubes 396 and the collection pipes 398 to facilitate installation and removal of the cartridges 302.

Other configurations of a filtration apparatus are also possible. For example, a filtration apparatus can have fiber membranes that are 80 cm long, contained in a cell that has L and W dimensions of 25 cm and 8 cm, respectively. Such a configuration was found to provide satisfactory (no tangling, no sludge fouling) operation in mixed liquor having solids concentration levels of 5-35 g/L, using 5-10 scfm cyclic aeration. Furthermore, the aerators can be optimized for use with membranes having free upper ends. In particular, fewer holes can be provided along the sides of aerators adjacent the panels defining each cell, and more holes can be provided for aeration between header segments in a cell.

Figure 16:
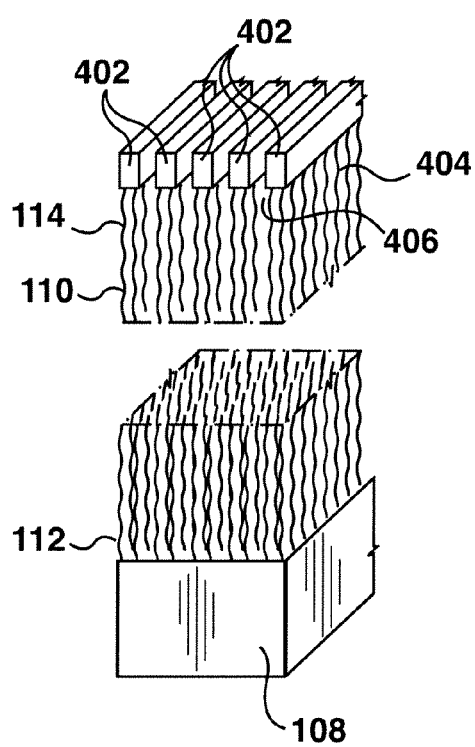
FIG. 16 is a perspective view of an alternate embodiment of loose upper ends of membranes.

As well, the loose upper ends 114 of the membranes 110 need not be free from all attachment to fall within the scope of the present invention. For example, with reference now to FIG. 16, the upper ends 114 of a portion of adjacent membranes 110 associated with a single header segment 108 may be attached to each other to form a sub-group 400 of membranes. This attachment may take the form of a support strip 402 extending along a row of membranes 110 in a direction parallel to the header segment 108, so that the sub-group 400 of membranes comprises a sheet 404 of membranes. The sheet 404 of membranes 110 may have only one row of membranes 110, or may be two or more rows of membranes 110 thick. In the embodiment illustrated, each sheet 404 comprises two rows of membranes 110, and a total of five sheets 404 are associated with each header segment 108. Gaps 406 are presented between adjacent support strips 402, which, combined with the mobility of the support strips 402 in the liquid 103, may inhibit formation of a dead zone below the support strips 402.

Figure 17:
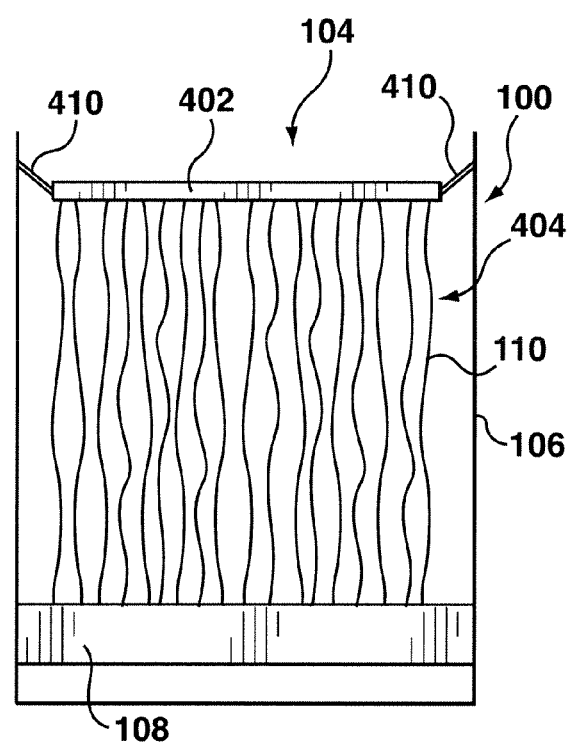
FIG. 17 is a side view of the embodiment of FIG. 16.

Securing the upper ends 114 of the membranes 110 to the support strips 402 can advantageously eliminate the need for sealing the upper ends 114, as described earlier. For example, the support strip can take the form of plastic or resin into which the upper ends 114 are potted, thereby simultaneously closing off the upper ends 114 of the membranes 110. Furthermore, the support strips 402 can be tethered to the housing 106 of the cell 104 by tethering strings 410 (FIG. 17), so that mobility of the support strips is maintained, while at the same time entanglement and collapse of the membranes is prevented.

Figure 18:
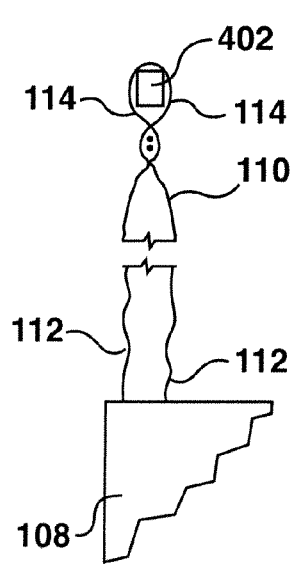
FIG. 18 is a front view of another alternate embodiment of loose upper ends of membranes.
Figure 19:
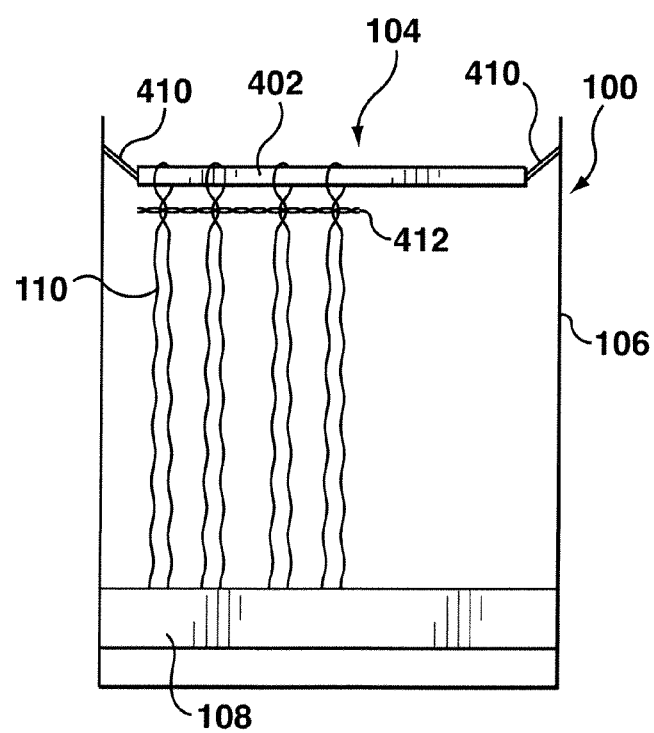
FIG. 19 is a side view of the embodiment of FIG. 18.

Another embodiment providing loose upper ends 114 of the membranes 110 in the apparatus 100 is shown in FIGS. 18 and 19. The upper support strip 402 tethered to the housing 106 by strings 410 is used as a support surface over which the membranes 110 are hung in a U-shaped configuration. Accordingly, each single membrane 110 has two lower ends 112 secured to a header segment 108, and two upper ends 114 adjacent the support strip 402. A plurality of membranes 110 provided along the length of a header segment 108 and a single support strip 402 define a membrane sheet 404. A spacing member 412 (FIG. 19) can be provided across the sheet 404 adjacent the support member 402 to facilitate holding the membranes 110 in position. The spacing member 412 can comprise, for example, but not limited to, a length of string or yarn weaved across the membranes 110.

While preferred embodiments of the invention have been described herein in detail, it is to be understood that this description is by way of example only, and is not intended to be limiting. The full scope of the invention is to be determined by reference to the appended claims.

We claim:

1. An apparatus for water treatment, comprising:
   a) a header having a permeate cavity;
   b) a plurality of support strips comprising potting material spaced vertically apart from the header; and
   c) a plurality of subgroups of hollow fiber membranes, the membranes in each subgroup having first ends potted in the header, and second ends potted in a different one of the plurality of support strips,
   wherein each of the plurality of support strips is located within the plan view extent of the header such that the plurality of subgroups of hollow fiber membranes are generally parallel to each other and the combined width of the plurality of support strips is less than the width of the header.

2. The apparatus of claim 1, wherein the lumens of the hollow fiber membranes are in fluid communication with the permeate cavity.

3. The apparatus of claim 1, wherein the lumens of the hollow fiber membranes are plugged at the second ends.

4. The apparatus of claim 3, wherein the lumens are plugged at the second ends by the support strips.

5. The apparatus of claim 1, wherein the header and the support strips are each elongate and aligned generally in parallel.

6. The apparatus of claim 1, wherein the header and support strips are generally horizontal when in use.

7. The apparatus of claim 6, wherein each one of the plurality of support strips is spaced vertically apart from the header.

8. The apparatus of claim 7, wherein the plurality of support strips are at about the same elevation when in use.

9. The apparatus of claim 8, wherein a lateral gap is provided between adjacent ones of the plurality of support strips.

10. The apparatus of claim 9, wherein each one of the plurality of support strips is tethered to a housing.

11. The apparatus of claim 1, wherein the hollow fiber membranes of at least one subgroup are arranged in a generally planar sheet.

12. The apparatus of claim 11, wherein each sheet comprises at least one row of the membranes, the second ends of the membranes of the at least one row generally aligned along the length of the support strip.

13. The apparatus of claim 11, wherein each sheet comprises at least two rows of the membranes.

* * * * *